United States Patent
Makuni et al.

(10) Patent No.: US 10,528,360 B2
(45) Date of Patent: Jan. 7, 2020

(54) STORAGE DEVICE, INFORMATION PROCESSING SYSTEM, METHOD OF ACTIVATING STORAGE DEVICE AND PROGRAM

(71) Applicant: Buffalo, Inc., Nagoya-shi (JP)

(72) Inventors: Kazuki Makuni, Nagoya (JP); Takayuki Okinaga, Nagoya (JP); Shuichiro Azuma, Nagoya (JP); Noriaki Sugahara, Nagoya (JP); Yu Nakase, Nagoya (JP)

(73) Assignee: BUFFALO INC., Nagoya-shi (JP)

( * ) Notice: Subject to any disclaimer, the term of this patent is extended or adjusted under 35 U.S.C. 154(b) by 208 days.

(21) Appl. No.: 15/647,985

(22) Filed: Jul. 12, 2017

(65) Prior Publication Data

US 2018/0018182 A1 Jan. 18, 2018

(30) Foreign Application Priority Data

Jul. 13, 2016 (JP) .................................. 2016-138348

(51) Int. Cl.
| | |
|---|---|
| *G06F 9/445* | (2018.01) |
| *G06F 3/06* | (2006.01) |
| *G06F 12/06* | (2006.01) |
| *G06F 13/16* | (2006.01) |

(52) U.S. Cl.
CPC ............ *G06F 9/445* (2013.01); *G06F 3/0655* (2013.01); *G06F 12/06* (2013.01); *G06F 13/1668* (2013.01)

(58) Field of Classification Search
CPC .... G06F 9/445; G06F 9/4401; G06F 13/1668; G06F 3/0655; G06F 12/06; G06F 12/08; G06F 3/0656; G06F 3/0658; G06F 9/4406; G06F 9/442; G06F 9/44578
See application file for complete search history.

(56) References Cited

U.S. PATENT DOCUMENTS

| | | | |
|---|---|---|---|
| 8,352,718 B1 * | 1/2013 | Rao ........................ | G06F 9/4401 711/118 |
| 2012/0331236 A1 * | 12/2012 | Kikuta ...................... | G06F 1/24 711/143 |
| 2013/0042067 A1 * | 2/2013 | Thomas .............. | G06F 12/0207 711/120 |

(Continued)

FOREIGN PATENT DOCUMENTS

| | | |
|---|---|---|
| JP | 2003-337746 | 11/2003 |
| JP | 2007-299242 | 11/2007 |

*Primary Examiner* — Phil K Nguyen
*Assistant Examiner* — Brian J Corcoran
(74) *Attorney, Agent, or Firm* — Xsensus, LLP

(57) ABSTRACT

A storage device includes a first memory which stores data including activation data necessary to activate a host device, a second memory, and a controller which performs writing and reading operation of data stored in the first memory based on a request from the host device; acquires address information including an address and data amount of data in the first memory, for which a read request is previously issued from the host device at activation of the host device; at activation of the storage device, reads data including at least the activation data from the first memory based on the address information and store the data in the second memory; and in response to a read request issued from the host device, transmits the data stored in the second memory to the host device.

12 Claims, 8 Drawing Sheets

(56) References Cited

U.S. PATENT DOCUMENTS

| | | | |
|---|---|---|---|
| 2014/0281458 A1* | 9/2014 | Ravimohan | G06F 9/4401 713/2 |
| 2016/0110205 A1* | 4/2016 | Van De Ven | G06F 9/4406 713/2 |

* cited by examiner

FIG.8

| LBA | SectorCount |
|---|---|
| 0h | 1h |
| 3Fh | 1h |
| 40h | 8h |
| 48h | 8h |
| 50h | 8h |

| UnitAddress | Size |
|---|---|
| 0h | 1h |
| 7h | 1h |
| 8h | 1h |
| 9h | 1h |
| Ah | 1h |

| UnitAddress | Size |
|---|---|
| 0h | 1h |
| 7h | 4h |

31e  31f  ~31

STORAGE DEVICE, INFORMATION PROCESSING SYSTEM, METHOD OF ACTIVATING STORAGE DEVICE AND PROGRAM

CROSS-REFERENCE TO RELATED APPLICATION

This application claims priority from Japanese Patent Application No. 2016-138348, filed on Jul. 13, 2016, the entire subject matter of which is incorporated herein by reference.

TECHNICAL FIELD

The disclosure relates to a storage device which stores activation data necessary to activate a host device, an information processing system, an activation method of the storage device and a program.

BACKGROUND ART

A host device including an industrial device such as a Multi-Function Peripheral (MFP) includes therein or is connected via an external interface to a storage device which stores activation data such as boot loader necessary to activate the host device.

When the host device having the storage device connected thereto is activated, the host device transmits to the storage device a read request command of the activation data such as boot loader stored in the storage device, and the storage device reads the activation data stored therein and transmits the same to the host device, in response to the read request command.

Since an Operating System (OS) for controlling the host device, work data and the like are also usually stored in the storage device, the storage device is required to have a large capacity and to be non-volatile. Therefore, as the related-art storage device, a Hard Disc Drive (HDD) device or a Solid State Drive (SSD) device using a NAND flash memory is used. A read speed of the HDD device or the SSD device is slower than a volatile memory that is to be used for a Random Access Memory (RAM). For this reason, a certain length of time is required to activate the host device.

In particular, as processes of the NAND flash memory evolve, a capacity of one chip increases, so that the number of chips necessary for the SSD device having the same capacity tends to decrease. The reduction in the number of chips necessary for the SSD device may result in a decrease of a parallel processing speed using a plurality of chips (i.e. a simultaneous read processing speed). For this reason, it is required to shorten the activation time of the host device to which the storage device having the activation data stored therein is connected.

In the meantime, there has been suggested a method of transmitting the activation data such as boot loader stored in the storage device to the RAM of the host device at the activation of the host device (for example, refer to JP-A-2007-299242 or JP-A-2003-337746). According to the method disclosed in JP-A-2007-299242 or JP-A-2003-337746, a special configuration is added to an existing storage device, so that the activation data is transmitted to the RAM of the host device. Therefore, it is difficult to apply this method to the existing storage device.

SUMMARY

According to an aspect of the disclosure, there is provided a storage device including: a first memory configured to store data including activation data necessary to activate a host device, an access position of the data being managed based on an address; a second memory; and a controller configured to: perform a writing operation and a reading operation of data stored in the first memory based on a request from the host device; acquire address information including the address and data amount of data in the first memory, for which a read request is previously issued from the host device at activation of the host device; at activation of the storage device, read data including at least the activation data from the first memory based on the address information and store the data in the second memory; and in response to a read request issued from the host device, transmit the data stored in the second memory to the host device.

According to another aspect of the disclosure, there is provided an information processing system including the host device configured to perform an activation operation by using activation data, and a storage device including: a first memory configured to store data including activation data necessary to activate a host device, an access position of the data being managed based on an address; a second memory; and a controller configured to: perform a writing operation and a reading operation of data stored in the first memory based on a request from the host device; acquire address information including an address and data amount of data in the first memory, for which a read request is previously issued from the host device at activation of the host device; at activation of the storage device, read data including at least the activation data from the first memory based on the address information and store the data in the second memory; and in response to a read request issued from the host device, transmit the data stored in the second memory to the host device.

According to a further aspect of the disclosure, there is provided an activation method of a storage device including a first memory which stores therein data including activation data necessary to activate a host device, an access position of the data being managed based on an address, a second memory, and a controller configured to perform a writing operation and a reading operation of data stored in the first memory based on a request from the host device. The method includes: acquiring address information including the address and a data amount of the data in the first memory, for which a read request is previously issued from the host device; at activation of the storage device, reading data including at least the activation data from the first memory based on the address information and storing the data in the second memory; and in response to a read request issued from the host device, transmitting the data stored in the second memory to the host device.

According to a still further aspect of the disclosure, there is provided a non-transitory computer-readable recording medium having a program stored therein, the program being executed by a computer including a first memory which stores therein activation data necessary to activate a host device, an access position of the data being managed based on an address, a second memory, and a controller configured to perform a writing operation and a reading operation of data stored in the first memory based on a request from the host device. When the program is executed by the computer, the program causes the controller to; acquire address information including the address and data amount of data in the first memory, for which a read request is previously issued from the host device at activation of the host device; at activation of the storage device, read data including at least the activation data from the first memory based on the address information and store the data in the second memory; and in response to a read request issued from the host device, transmit the data stored in the second memory to the host device.

BRIEF DESCRIPTION OF DRAWINGS

FIG. 8 illustrates an example of address information of the SSD device according to the illustrative embodiment.

FIG. 9 illustrates another example of the address information of the SSD device according to the illustrative embodiment.

FIG. 10 illustrates still another example of the address information of the SSD device according to the illustrative embodiment.

DETAILED DESCRIPTION

The disclosure has been made in view of the above circumstances and provides a storage device that can be applied to an existing storage device and shorten an activation time of a host device, an information processing system, an activation method of the storage device and a program.

Illustrative Embodiment

Hereinafter, an illustrative embodiment of the disclosure will be described with reference to the drawings.

(Configuration of SSD Device of Illustrative Embodiment)

Figure 1:
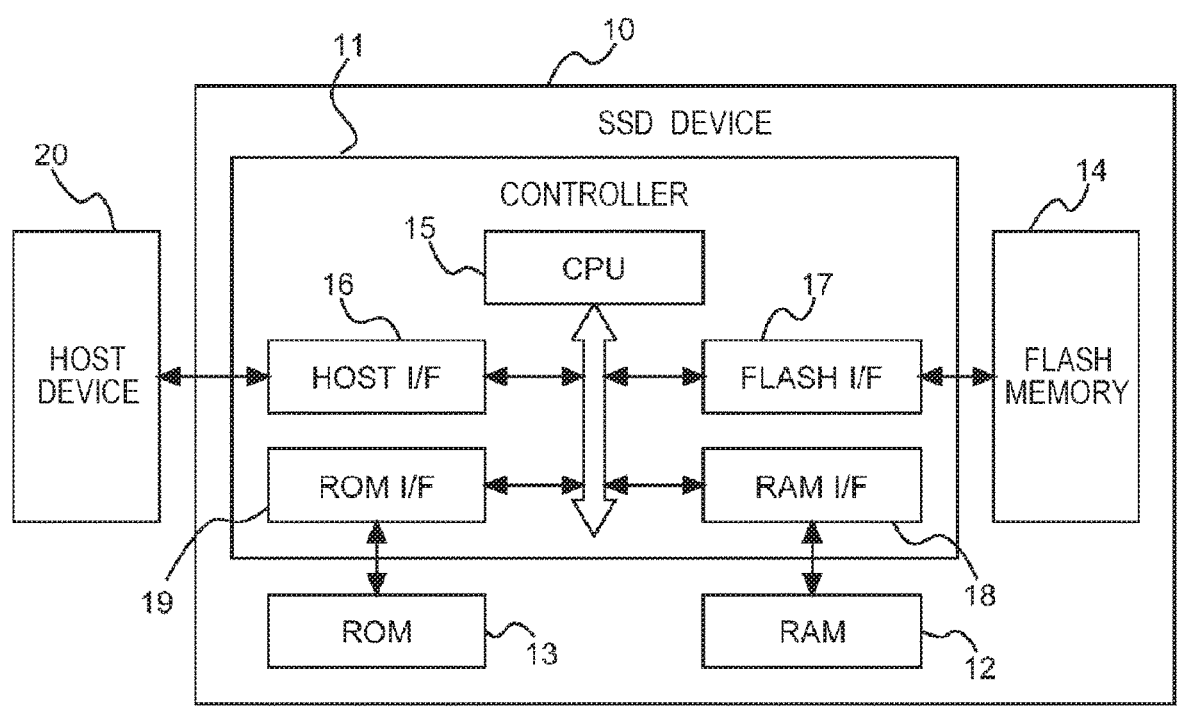
FIG. 1 is a block diagram illustrating a schematic configuration of an SSD device according to an illustrative embodiment of the disclosure.
Figure 2:
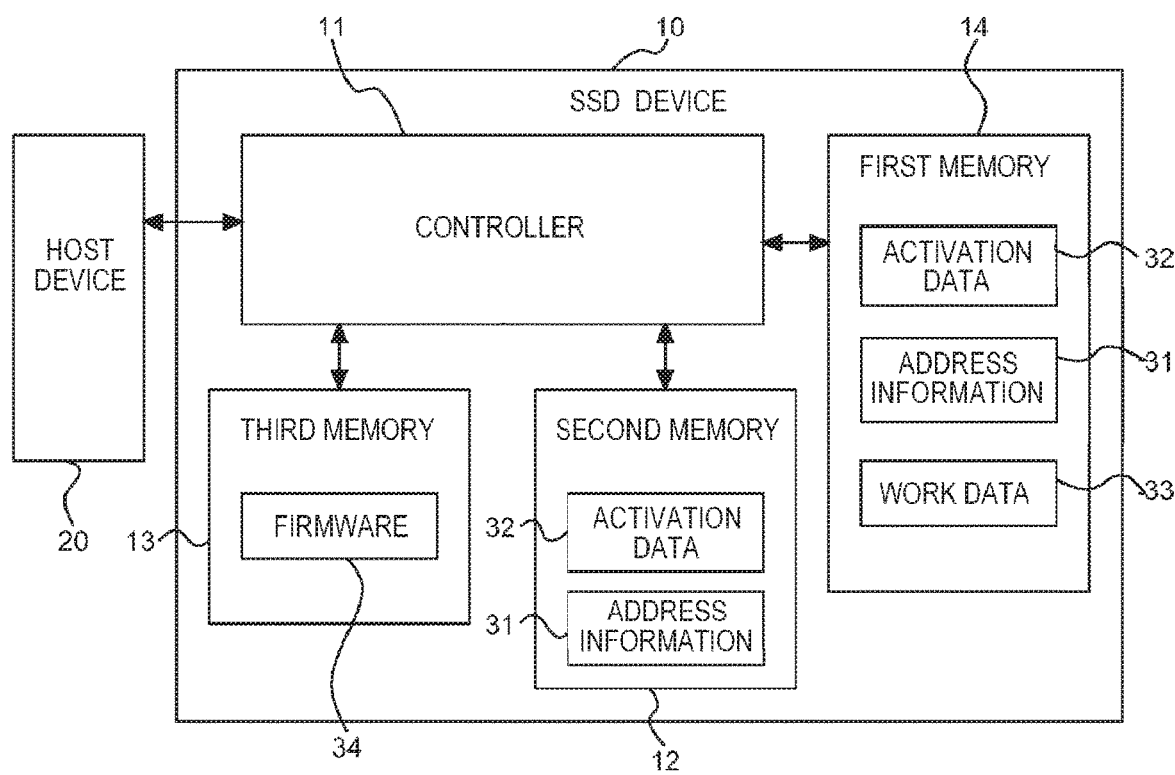
FIG. 2 is a block diagram illustrating a functional configuration of the SSD device according to the illustrative embodiment.

FIG. 1 is a block diagram illustrating a schematic configuration of an illustrative embodiment in which the storage device of the disclosure is applied to an SSD device, and FIG. 2 is a block diagram illustrating a functional configuration of the SSD device according to the illustrative embodiment.

In FIGS. 1 and 2, an SSD device 10 includes a controller 11, a Random Access Memory (RAM) 12, a Read Only Memory (ROM) 13 and a flash memory 14. The SSD device 10 is connected to a host device 20, which is an MFP in the illustrative embodiment, and is configured to store predetermined data therein in accordance with a write command from the host device 20 and to transmit the predetermined data in accordance with a read command.

The controller 11 is configured to control the SSD device 10 and has a Central Processing Unit (CPU) 15, a host interface (I/F) 16, a flash interface (I/F) 17, a RAM interface (I/F) 18 and a ROM interface (I/F) 19.

The CPU 15 is configured to control the controller 11 and the SSD device 10 as firmware (not shown in FIG. 1) stored in the ROM 13 is developed into the RAM 12 at the power-on and is executed and has functions indicated in respective functional units shown in FIG. 2. The respective functional units shown in FIG. 2 will be described later. The host I/F 16 is connected to the host device 20 via a predetermined external interface and is configured to transmit and receive data to and from the host device 20 based on a protocol determined by the external interface and a command, under control of the CPU 15. In the illustrative embodiment, the host I/F 16 and the host device 20 are connected to each other by an interface such as ATA and SCSI, which is used for an HDD and the like and has general versatility. The flash I/F 17 is connected to the flash memory 14 and is configured to perform operations of writing and reading data to and from the flash memory 14 under control of the CPU 15. The RAM I/F 18 is connected to the RAM 12 and is configured to perform operations of writing and reading data to and from the RAM 12 under control of the CPU 15. The ROM I/F 19 is connected to the ROM 13 and is configured to perform an operation of reading data from the ROM 13 under control of the CPU 15.

The RAM 12 is used as a work memory of the controller 11 and is configured to temporarily store therein a variety of data. Also, the RAM 12 may store address information including an address of the flash memory 14, for which a read request is previously issued from the host device 20 at the activation of the host device 20, and a data amount of data for which the read request is previously issued, and data including activation data necessary to activate the host device 20 (not shown in FIG. 1). For this reason, preferably, the RAM 12 has a large capacity of about 200 MB. The address information and the activation data will be described later in detail. As described above, the ROM 13 stores the firmware for controlling the SSD device 10.

In the illustrative embodiment, the flash memory 14 is a NAND-type flash memory. Also, a space in the flash memory 14 is perceived by a Logical Block Addressing (LBA) and a physical block, and the host device 20 is configured to access data in a specific area by directly designating the logical block addressing. When the logical block addressing is directly designated from the host device 20, the controller 11 specifies a physical block, which is to be actually accessed, by referring to a logical block addressing-physical block conversion table (not shown) stored in the RAM 12, and accesses the physical block. Meanwhile, in the descriptions of the illustrative embodiment, the logical block addressing may also be simply referred to as "address".

Meanwhile, in the flash memory 14 according to the illustrative embodiment, one physical block has a plurality of pages, and a data writing operation is performed in a unit of a page and a data erasing operation is performed in a unit of a block. Also, each page consists of a plurality of sectors.

(Functional Configuration of SSD Device of Illustrative Embodiment)

FIG. 2 is a block diagram illustrating a functional configuration of the SSD device 10 according to the illustrative embodiment. The SSD device 10 according to the illustrative embodiment has the controller 11, a first memory, which is the flash memory 14, a second memory, which is the RAM 12, and a third memory, which is the ROM 13.

The controller 11 is configured to mainly control reading and writing operations of data from and to the first memory 14 and is connected to the host device 20 via the interface such as ATA and SCSI, which has general versatility. The controller 11 is configured to receive a read request command, a writing request command and data to be written, which are to be transmitted from the host device 20, and to read data stored in the first memory 14, to write data and to transmit the read data to the host device 20, based on the commands. The controller 11 is configured to control reading and writing operations of data from and to the second memory 12 and the third memory 13 connected to the controller 11.

Particularly, the controller 11 according to the illustrative embodiment is configured to acquire address information 31 including an address of the first memory 14, for which a read request is previously issued from the host device 20 at the activation of the host device 20, and a data amount of data, for which the read request is previously issued. Also, the controller 11 is configured to read data, which includes at least activation data 32, from the first memory 14 by using the address information 31 and to store the read data in the second memory 12, at activation of the SSD device 10. When a read request is issued from the host device 20, the controller 11 transmits the data including the activation data 32 and stored in the second memory 12 to the host device 20. The operations of the controller 11 will be again described later in detail.

Herein, preferably, the controller 11 is configured to store the address information 31 in the second memory 12. More preferably, whenever the read request command is received from the host device 20, the controller 11 is configured to store the address of the first memory 14, for which the read request is previously issued from the host device 20, and the data amount of data, for which the read request is previously issued, in the second memory 12.

Preferably, the controller 11 is configured to store the address information 31 stored in the second memory 12 in a specific address of the first memory 14 at a predetermined timing. Also, preferably, the predetermined timing is a timing at which a writing request is issued from the host device 20 or a timing at which a predetermined amount of address information, for example, address information corresponding to thousands of commands is stored in the second memory 12.

Also, the controller 11 is preferably configured to access the specific address of the first memory 14 at the activation of the SSD device 10 and to acquire the address information 31. The specific address will be described later in detail.

In the first memory 14, the address information 31, the activation data 32 and work data 33 are stored.

As described above, the address information 31 includes the address of the first memory 14 for which the read request is previously issued from the host device 20 at the activation of the host device 20 and the data amount of data for which the read request is previously issued. Herein, the address information 31 is preferably configured so that sets of logical block addressing of read start positions of data and data amounts of data to be read from the logical block addressings are arranged in order of the read requests from the host device 20. Also, the address information 31 is preferably configured so that sets of management unit addresses, in which the logical block addressing of the read start position of the data is delimited to a size of a management unit of the first memory 14 in the controller 11, and management unit data amounts, in which the data amount of data to be read from the management unit address is delimited in a unit of the size, are arranged in order of the read requests from the host device 20.

The address information 31 is preferably stored in a specific address of the first memory 14. The specific address includes an address described in advance in a firmware 34 (which will be described later), an address in a non-user area (management area) of the first memory 14, i.e., in an area under management of an Operating System (OS) of the host device 20, and an address, which is not normally used by the OS of the host device 20 and an application program, of a user area. Also, as the address that is not normally used, an address corresponding to LBA 0x0001, which is a next address of a Master Boot Record (MBR), or a final LBA+1 may be exemplified.

As described above, the activation data 32 is data necessary to activate the host device 20 and includes at least boot loader and data, which is necessary at the activation of the host device 20, of the OS. The activation data 32 is stored in a predetermined address of the first memory 14, and the host device 20 can perceive the address of the first memory 14 in which the activation data 32 is stored and a read amount of data including the activation data 32. The work data 33 is data that is to be stored at operation of the host device 20.

The second memory 12 stores the address information 31 and the activation data 32 as necessary. However, the address information 31 and the like are temporarily stored in the second memory 12 at a predetermined timing and the activation data 32 is transmitted to the host device 20 at a predetermined timing, as described later in detail. Herein, a data read speed of the second memory 12 is preferably faster than a data read speed of the first memory 14, and is more preferably close to a data transfer speed from the controller 11 to the host device 20.

In the third memory 13, the firmware 34 is stored.

In the above descriptions, the controller 11 is implemented by the CPU 15, the first memory 14 is implemented by the flash memory 14, the second memory 12 is implemented by the RAM 12 and the third memory 13 is implemented by the ROM 13.

(Details of Address Information of Illustrative Embodiment)

In the below, the address information 31 that is to be stored in the first memory 14 and the second memory 12 of the SSD device 10 according to the illustrative embodiment is described with reference to FIGS. 8 to 10.

FIG. 8 illustrates an example of the address information 31 of the SSD device 10 according to the illustrative embodiment. The address information 31 shown in FIG. 8 includes a logical block addressing area 31a, in which a read start Logical Block Addressing (LBA) of the first memory 14 in the read request command from the host device 20 is described, and a sector count area 31b in which a read data amount of data from the read start logical block addressing is described as a number of sectors (SectorCount). In each area, a set of the read start logical block addressing and the number of sectors is stored in arrival order of the read request command from the host device 20.

FIG. 9 illustrates another example of the address information 31 of the SSD device 10 according to the illustrative embodiment. The address information 31 shown in FIG. 9 includes a management address area 31c, in which a management address (UnitAddress) where a read start logical block addressing of the first memory 14 in the read request command from the host device 20 is delimited to a management size unit (4 KB in the example of FIG. 9) of the first memory 14 by the firmware 34 of the SSD device 10 is described, and a management size area 31d in which a read amount of data from the management address is described in the management size unit (Size). In each area, a set of the management address and the management size is stored in arrival order of the read request command from the host device 20.

FIG. 10 illustrates still another example of the address information 31 of the SSD device 10 according to the illustrative embodiment. Like the address information 31 shown in FIG. 9, the address information 31 shown in FIG. 10 includes a management address area 31e, in which a management address (UnitAddress) where a read start logical block addressing of the first memory 14 in the read request command from the host device 20 is delimited to a management size unit of the first memory 14 by the firmware 34 of the SSD device 10 is described, and a management size area 31f in which a read amount of data from the management address is described in the management size unit (Size). In the address information 31 of FIG. 10, when data is continuously or redundantly read from the read start address for which the read request is issued from the host device 20, a management size of data to be read is increased to collectively describe the management addresses. For instance, in the example of FIG. 10, when the read request, which is the same as the example of FIG. 9, is issued from the host device 20, since the management addresses of FIG. 9 are continuous addresses of 7h to Ah, the management size, which is a data read amount from the management address 7h, is described as 4h, so that the management addresses to be described in the management address area 31e are collectively described.

However, in the example of FIG. 10, as described later, when temporarily storing the read request command from the host device 20 in the second memory 12, it is checked whether the management addresses are continuous, and the management addresses are then collectively described when it is determined that the management addresses are continuous. Therefore, the determination as to whether the management addresses are redundant or continuous may be limited to two previous commands.

Also, in the address information 31 of FIGS. 8 to 10, the read start address, the data amount and the like are described in arrival order of the read request command from the host device 20. However, considering the efficiency of reading the activation data 32 from the first memory 14, the read start address may be rearranged in ascending order (or in descending order). However, when the power of the SSD device 10 is cutoff while rearranging the address information 31, the address information 31 itself may be damaged. Therefore, the read start address and the like are preferably stored in arrival order of the read request command from the host device 20.

In the meantime, since the read data amount of the address information 31 of FIGS. 8 to 10 has the sector unit or the management size unit, the data read based on the address information 31 may include data, in addition to the activation data 32. However, even when the read data includes data, in addition to the activation data 32, a particular problem is not caused.

(Outline of Operations of SSD Device of Illustrative Embodiment)

Figure 3:
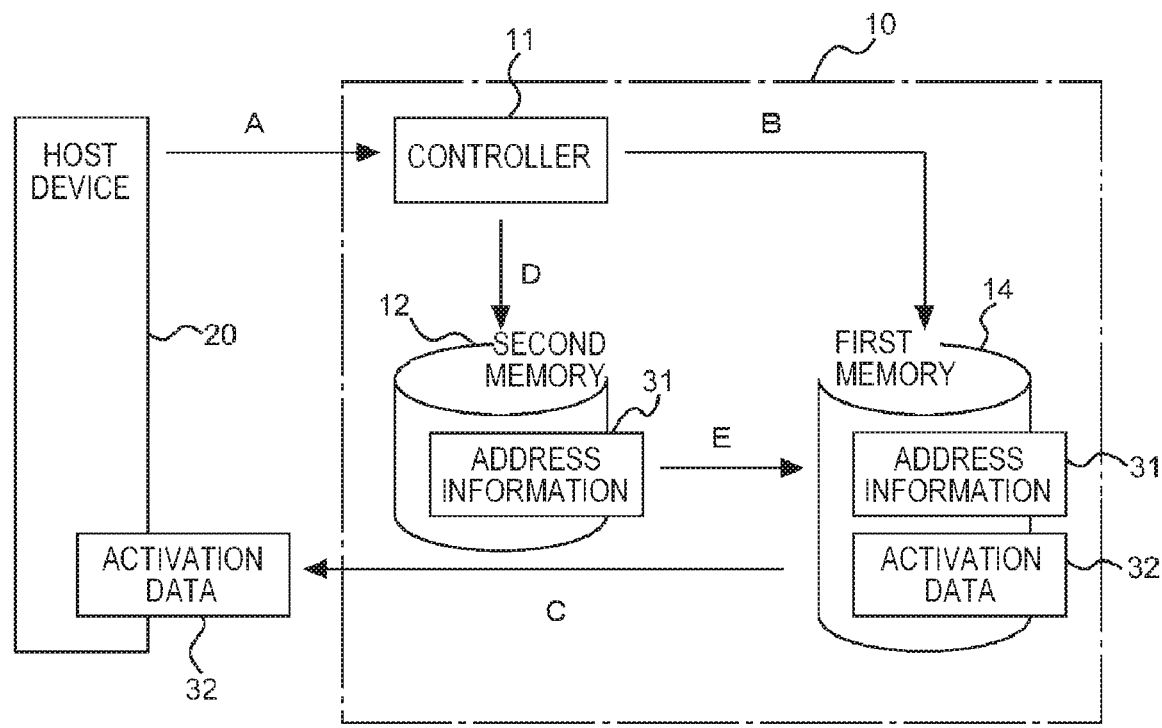
FIG. 3 illustrates operations of the SSD device according to the illustrative embodiment at an initial activation.
Figure 4:
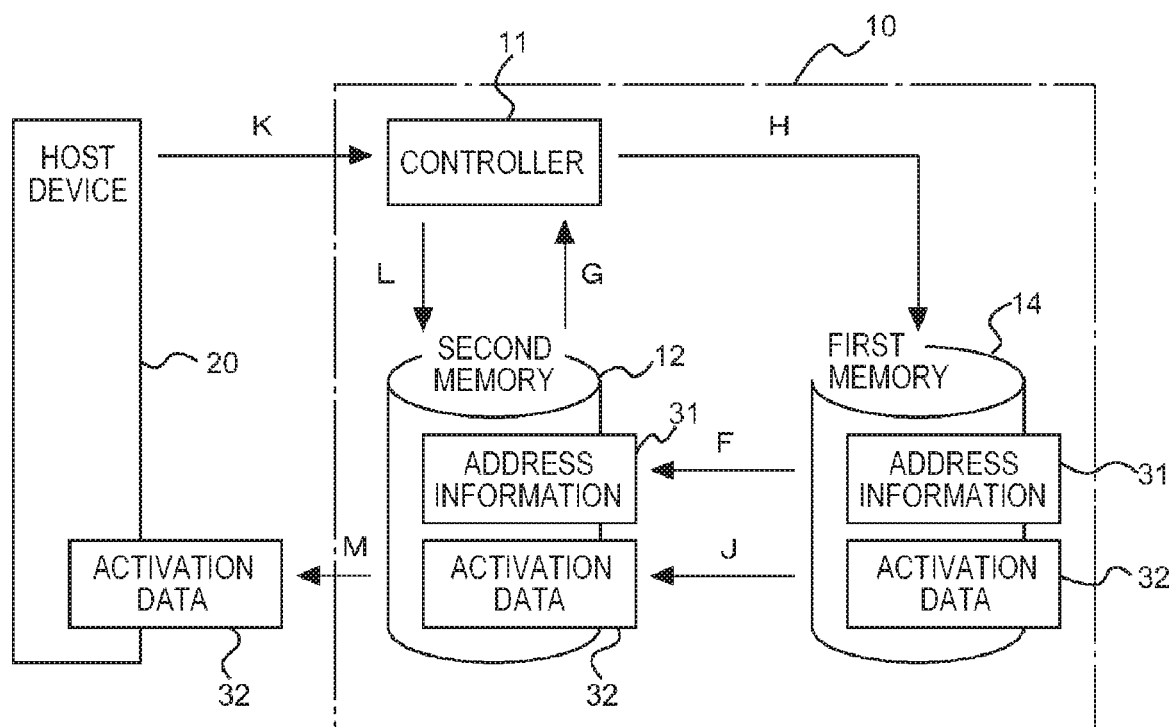
FIG. 4 illustrates operations of the SSD device according to the illustrative embodiment at a normal activation.

Subsequently, an outline of operations of the SSD device 10 according to the illustrative embodiment is described with reference to FIGS. 3 and 4. FIGS. 3 and 4 illustrate examples of the operations of the SSD device according to the illustrative embodiment, in which FIG. 3 illustrates the operations of the SSD device at an initial activation and FIG. 4 illustrates the operations of the SSD device at a normal activation. Herein, the description "at the initial activation" indicates a state where collection of the address information 31 and storing of the same into the first memory 14 are not performed, and the description "at the normal activation" indicates a state where the address information 31 is already stored in the first memory 14.

The operations of FIG. 3 are performed at the initial activations of the host device 20 and the SSD device 10. First, as shown with an arrow A in FIG. 3, when the power is fed to the host device 20 and the operation of the host device 20 starts, a read request for the activation data 32 stored in the first memory 14 of the SSD device 10 is transmitted from the host device 20 to the SSD device 10 by the operations of the firmware and the like in the host device 20.

The controller 11 of the SSD device 10 accesses the first memory 14 and reads the activation data 32 based on the read request from the host device 20, as shown with an arrow B in FIG. 3, and transmits the activation data 32 to the host device 20, as shown with an arrow C in FIG. 3. In parallel with the operations, as shown with an arrow D in FIG. 3, the controller 11 of the SSD device 10 arranges the address of the first memory 14 for which the read request is issued from the host device 20 and the data amount of data for which the read request is issued, in order of the read request from the host device 20, and stores the same in the second memory 12.

Then, when the predetermined timing comes, the controller 11 of the SSD device 10 stores the address information 31 stored in the second memory 12 in the specific address of the first memory 14, as shown with an arrow E of FIG. 3.

Subsequently, the operations of FIG. 4 are performed at the normal activations of the host device 20 and the SSD device 10. First, w en the power is fed to the SSD device 10 and the operation of the SSD device 10 starts, the firmware 34 stored in the third memory 13 of the SSD device 10 is executed. By the operations of the firmware 34, the controller 11 of the SSD device 10 reads the address information 31 stored in the specific address of the first memory 14 and stores the address information 31 in the second memory 12, as shown with an arrow F in FIG. 4. Then, the controller 11 reads the address information 31 stored in the second memory 12, as shown with an arrow G in FIG. 4, reads the activation data 32 stored in the first memory 14, based on the address information 31, as shown with an arrow H in FIG. 4, and stores the activation data 32 in the second memory 12, as shown with an arrow J in FIG. 4.

Usually, the read request command from the host device 20 arrives at the SSD device 10 after the activation of the firmware of the host device 20 is over, for example (refer to an arrow K in FIG. 4). For this reason, the controller 11 of the SSD device 10 issues an instruction to transmit to the host device 20 data, which corresponds to the read request command from the host device 20, of the activation data 32 read from the first memory 14 and stored in the second memory 12, in response to the read request command from the host device 20, as shown with an arrow L in FIG. 4, and transmits the data to the host device 20, as shown with an arrow M in FIG. 4.

Since the first memory 14 according to the illustrative embodiment is a NAND-type flash memory and the second memory 12 is a RAM, which is a volatile memory, the data read speed of the second memory 12 is faster than the data read speed of the first memory 14. As shown in FIG. 4, the activation data 32 is read in advance from the first memory 14 and is transmitted to the second memory 12, so that when the read request command is received from the host device 20, the activation data 32 stored in the second memory 12 is transmitted to the host device 20. Thereby, as compared to a configuration where whenever the read request command from the host device 20 arrives, the first memory 14 is accessed and the activation data 32 is read, it is possible to transmit the activation data 32 to the host device 20 at a higher speed, so that it is possible to shorten the activation time of the host device 20.

(Operations of SSD Device of Illustrative Embodiment)

Subsequently, the operations of the SSD device 10 according to the illustrative embodiment are described with reference to flowcharts shown in FIGS. 5 to 7.

Figure 5:
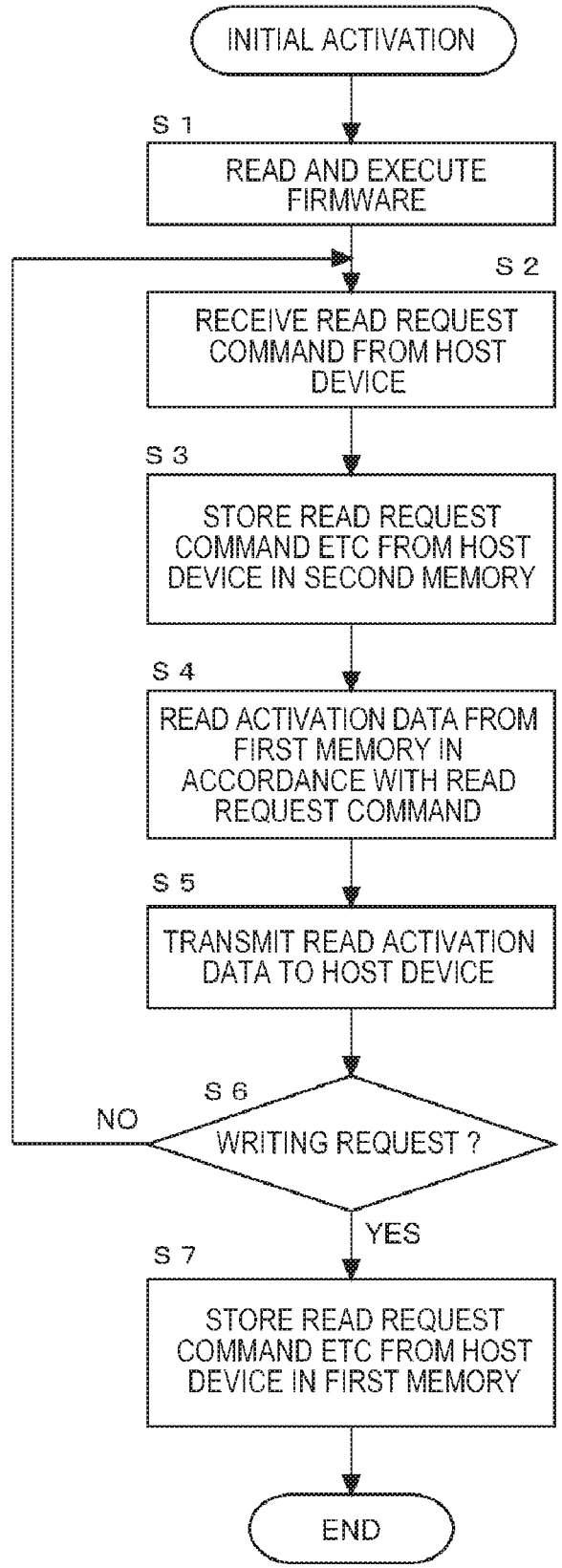
FIG. 5 is a flowchart for illustrating the operations of the SSD device according to the illustrative embodiment at the initial activation.

First, FIG. 5 is a flowchart for illustrating the operations of the SSD device 10 according to the illustrative embodiment at the initial activation.

The operations shown in the flowchart of FIG. 5 start when the power is fed to the SSD device 10. First, in step S1, the controller 11 reads the firmware 34 stored in the third memory 13, and develops and executes the firmware 34 into the second memory 12.

In step S2, the controller 11 receives the read request command from the host device 20. In step S3, the controller 11 stores the address of the first memory 14 for which the read request is issued from the host device 20 in step S2 and the data amount of data for which the read request is issued, in the second memory 12.

In step S4, the controller 11 accesses the first memory 14 and reads the activation data 32 therefrom in accordance with the read request command from the host device 20. In step S5, the controller 11 transmits the activation data 32 read from the first memory 14 to the host device 20.

In step S6, it is determined whether a writing request command from the host device 20 is arrived at the SSD device 10. When it is determined that the writing request command is arrived (YES in step S6), the program proceeds to step S7, and when it is determined that the writing request command is not arrived (NO in step S6), the program returns to step S2 and repeats the operations of steps S2 to S6.

In step S7, the controller 11 stores a set of the address of the first memory 14 stored in the second memory 12 and the data amount of data for which the read request is issued, in the specific address of the first memory 14. Thereby, the address information 31 in which the address of the first memory 14 for which the read request is issued from the host device 20 and the data amount of data for which the read request is issued are arranged in order of the read request from the host device 20 is stored in the specific address of the first memory 14.

Figure 6:
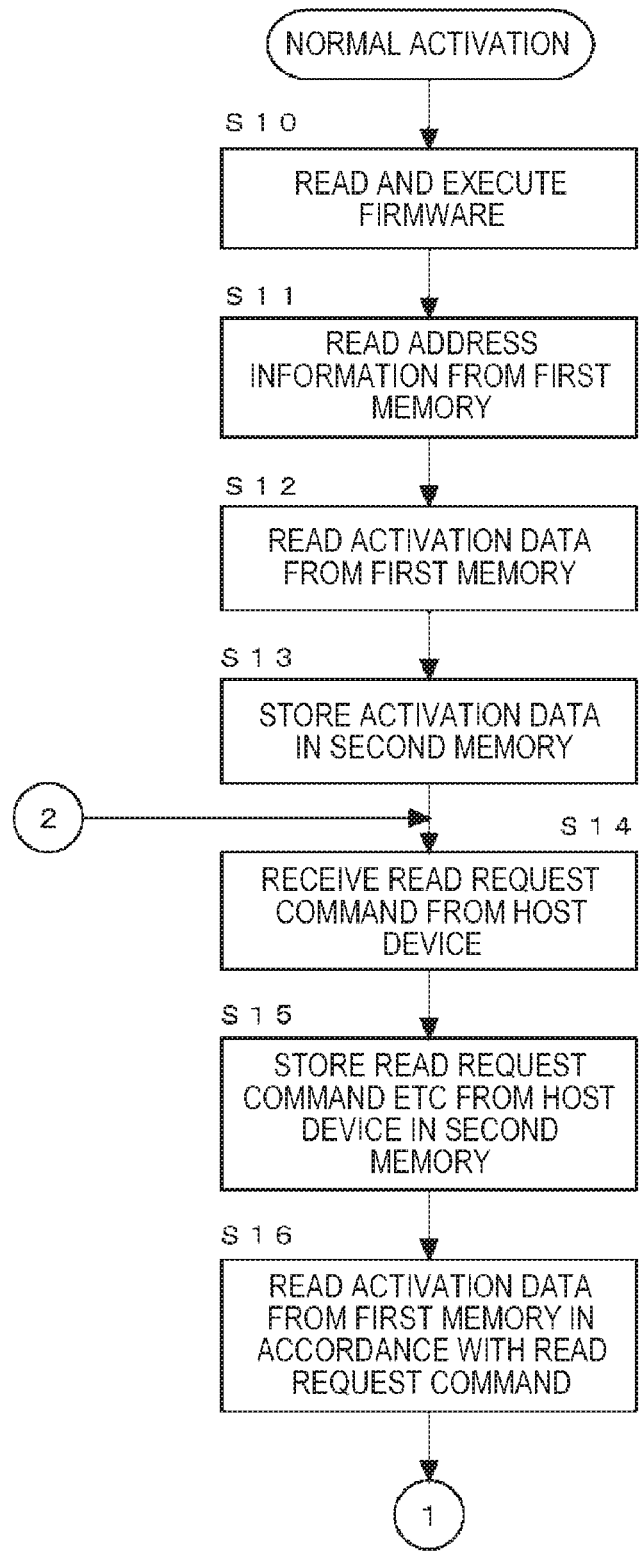
FIG. 6 is a flowchart for illustrating the operations of the SSD device according to the illustrative embodiment at the normal activation.
Figure 7:
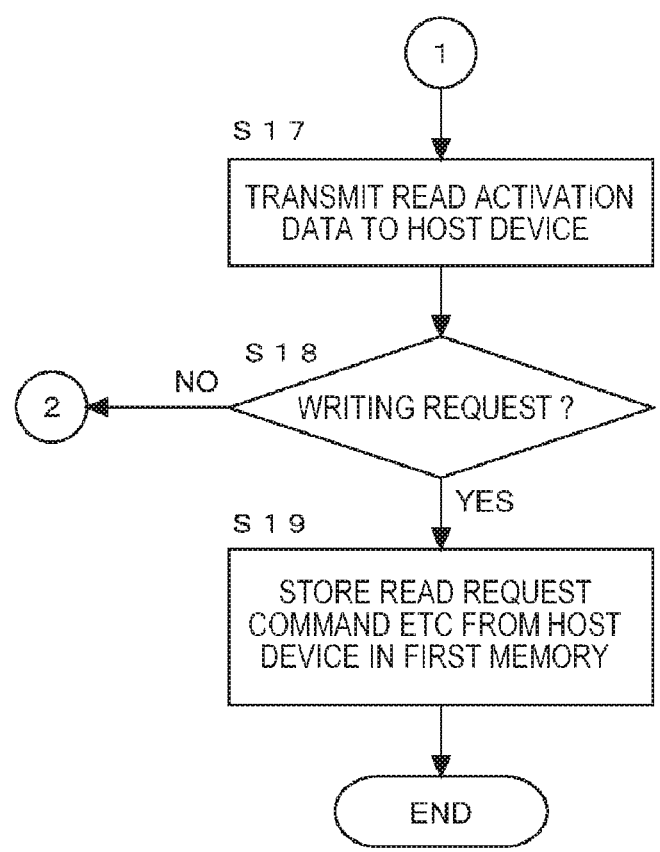
FIG. 7 is a flowchart for illustrating the operations of the SSD device according to the illustrative embodiment at the normal activation.

FIGS. 6 and 7 are flowcharts for illustrating the operations of the SSD device 10 according to the illustrative embodiment at the normal activation.

The operations shown in the flowchart of FIG. 6 start when the power is fed to the SSD device 10. First, in step S10, the controller 11 reads the firmware 34 stored in the third memory 13, and develops and executes the firmware 34 into the second memory 12.

In step S11, the controller 11 reads the address information 31 stored in the specific address of the first memory 14. Then, in step S12, the controller 11 reads the activation data 32 from the first memory 14 based on the address information 31 read in step S11, and in step S13, stores the activation data 32 read in step S12 in the second memory 12.

In step S14, the controller 11 receives a read request command from the host device 20. In step S15, the controller 11 stores the address of the first memory 14 for which the read request is issued from the host device 20 in step S2 and the data amount of data for which the read request is issued, in the second memory 12.

In step S16, the controller 11 accesses the second memory 12 and reads the activation data 32 in accordance with the read request command from the host device 20. Then, in step S17, the controller 11 transmits the activation data 32 read from the second memory 12 to the host device 20.

In step S18, it is determined whether the writing request command from the host device 20 is arrived at the SSD device 10. When it is determined that the writing request command is arrived (YES in step S18), the program proceeds to step S19. When it is determined that the writing request command is not arrived (NO in step S18), the program returns to step S14 and repeats the operations of steps S14 to S18.

In step S19, the controller 11 stores a set of the address of the first memory 14 stored in the second memory 12 and the data amount of data for which the read request is issued, in the specific address of the first memory 14.

Meanwhile, when the writing request command (step S14) from the host device 20 is at the SSD device 10 before the operation of storing the activation data 32 in the second memory 12 (step S13 in FIG. 6), the read request command from the host device 20 is preferably preferentially processed.

(Effects of SSD Device of Illustrative Embodiment)

As described above in detail, the SSD device 10 according to the illustrative embodiment is configured to first read the activation data 32 stored in the first memory 14 at the activation of the SSD device 10 and to store the same in the second memory 12. Then, when the read request command from the host device 20 to the SSD device 10 arrives, the SSD device 10 transmits the activation data 32 stored in the second memory 12 to the host device 20, in response to the read request command. The timing at which the read request command from the host device 20 arrives is usually after the firmware of the host device 20 is activated and a predetermined time lag occurs after the SSD device 10 is activated. For this reason, the activation data 32 is read and written in the second memory 12 during the time lag, so that when the read request command from the host device 20 to the SSD device 10 arrives, the activation data 32 can be immediately transmitted to the host device 20. Therefore, it is possible to shorten the activation time of the host device 20.

In addition, since the data read speed of the second memory 12 is faster than the data read speed of the first memory 14, it is possible to transmit the activation data 32 to the host device 20 at higher speed, as compared to a configuration where the first memory 14 is accessed and the activation data 32 is read whenever the read request command from the host device 20 arrives. As a result, it is possible to shorten the activation time of the host device 20.

Further, the SSD device 10 according to the illustrative embodiment can shorten the activation time of the host device 20 without adding the special hardware to an existing SSD device.

From the above descriptions, according to the illustrative embodiment, it is possible to implement the SSD device 10 that can be applied to an existing storage device and can shorten the activation time of the host device.

Modified Embodiments

In the meantime, the storage device of the disclosure is not limited to the illustrative embodiment, and a variety of modified embodiments can be made. For example, in the illustrative embodiment, the address information 31 and the activation data 32 are stored in the RAM 12, which is a volatile memory. However, a non-volatile memory such as a Magnetoresistive Random Access Memory (MRAM) may be prepared as the second memory, and the address information 31 and the activation data 32 may stored in the non-volatile memory.

The invention claimed is:

1. A storage device, comprising:
    a first memory that stores data including activation data necessary to activate a host device, an access position of the data being managed based on an address;
    a second memory; and
    processing circuitry configured to:
        perform a writing operation and a reading operation of data stored in the first memory based on a request from the host device;
        acquire address information including the address and a data amount of data in the first memory, for which a read request is previously issued from the host device at activation of the host device;
        at activation of the storage device, read data including at least the activation data from the first memory based on the address information and store the data in the second memory;
        in response to a read request issued from the host device, transmit the data stored in the second memory to the host device;
        store the address information in the second memory; and
        store the address information, stored in the second memory, at a specific address of the first memory at a predetermined timing, wherein
    the predetermined timing is a timing at which a writing request is issued from the host device or at which a predetermined amount of the address information is stored in the second memory.

2. The storage device according to claim 1, wherein a read speed of the data of the second memory is faster than a read speed of the data of the first memory.

3. The storage device according to claim 1, wherein the address information includes sets of a logical address of a read start position of the data and a data amount of the data to be read from the logical address which are arranged in order of read requests from the host device.

4. The storage device according to claim 3, wherein the data amount of the data to be read from the logical address of the read start position of the data is stored as a number of unit amounts of data writing operation.

5. The storage device according to claim 3, wherein the address information includes sets of a management unit address, in which the logical address of the read start position of the data is delimited to a size of a management unit of the first memory in the processing circuitry, and a management unit data amount, in which a data amount of the data to be read from the management unit address is delimited in a unit of the size, which are arranged in order of the read requests from the host device.

6. The storage device according to claim 5, wherein when read requests for data are made continuously or redundantly from the management unit address, the management unit data amount to be described as the address information is increased to collectively describe the management unit addresses.

7. The storage device according to claim 6, wherein the management unit addresses to be collected is limited to a predetermined number.

8. The storage device according to claim 1, wherein the processing circuitry is further configured to access a specific address of the first memory at the activation of the storage device and to acquire the address information.

9. The storage device according to claim 1, wherein the first memory is provided in a non-volatile memory and the second memory is provided in a volatile memory.

10. An information processing system comprising:
    the host device configured to perform an activation operation by using activation data, and
    the storage device according to claim 1.

11. An activation method of a storage device including a first memory which stores therein data including activation data necessary to activate a host device, an access position of the data being managed based on an address, a second memory, and a processing circuitry configured to perform a writing operation and a reading operation of data stored in the first memory based on a request from the host device, the activation method comprising:
    acquiring address information including the address and a data amount of the data in the first memory, for which a read request is previously issued from the host device;
    at activation of the storage device, reading data including at least the activation data from the first memory based on the address information and storing the data in the second memory;
    in response to a read request issued from the host device, transmitting the data stored in the second memory to the host device;
    storing the address information in the second memory; and
    storing the address information, stored in the second memory, at a specific address of the first memory at a predetermined timing, wherein
    the predetermined timing is a timing at which a writing request is issued from the host device or at which a predetermined amount of the address information is stored in the second memory.

12. A non-transitory computer-readable recording medium having a program stored therein, the program being executed by a computer including a first memory which stores therein activation data necessary to activate a host device, an access position of the data being managed based on an address, a second memory, and processing circuitry configured to perform a writing operation and a reading operation of data stored in the first memory based on a request from the host device, when the program is executed by the computer, the program causes the processing circuitry to:
    acquire address information including the address and data amount of data in the first memory, for which a read request is previously issued from the host device at activation of the host device;
    at activation of the computer, read data including at least the activation data from the first memory based on the address information and store the data in the second memory;
    in response to a read request issued from the host device, transmit the data stored in the second memory to the host device;
    store the address information in the second memory; and
    store the address information, stored in the second memory, at a specific address of the first memory at a predetermined timing, wherein
    the predetermined timing is a timing at which a writing request is issued from the host device or at which a predetermined amount of the address information is stored in the second memory.

* * * * *